United States Patent Office 3,475,505
Patented Oct. 28, 1969

3,475,505
PROCESS FOR THE PREPARATION OF
1,2-DICHLORETHANE
Lothar Hornig and Gunther Mau, Frankfurt am Main, and Lothar Hirsch, Kelkheim, Taunus, Germany, assignors to Farbwerke Hoechst Aktiengesellschaft vormals Meister Lucius & Bruning, Frankfurt am Main, Germany
No Drawing. Filed July 6, 1965, Ser. No. 469,908
Claims priority, application Germany, July 14, 1964,
F 43,432
Int. Cl. C07c 17/08
U.S. Cl. 260—659     4 Claims

ABSTRACT OF THE DISCLOSURE

Process for preparing 1,2-dichloroethane from ethylene hydrogen chloride and oxygen in the presence of a catalyst of tellurium and/or a tellurium compound.

---

The present invention relates to a process for the preparation of 1,2-dichlorethane.

1,2-dichlorethane is obtained on an industrial scale by the addition of chlorine to ethylene. It can also be prepared by causing hydrogen chloride and oxygen to act upon ethylene in the presence of a catalyst containing copper and/or a copper compound whereby yields of 90% (calculated on the ethylene used) are easily attainable.

Now we have found that 1,2-dichlorethane can be prepared from ethylene, hydrogen chloride and oxygen when the reaction is carried out in the presence of tellurium and/or a tellurium compound as a catalyst.

As catalyst there is used elementary tellurium or one or more tellurium compounds. The tellurium compounds may contain the tellurium in any desired valency stage. Those compounds are preferred which can easily be obtained on an industrial scale, especially the compounds of tetravalent tellurium, such as tellurium-(IV)-oxide, tellurium-(IV)-chloride and tellurium-(IV)-oxychloride. However, compounds of bivalent tellurium, such as tellurium-(II)-oxide and tellurium-(II)-chloride are also suitable, as are tellurium nitrates, tellurites and tellurates, especially alkali metal tellurites and alkali metal tellurates and mixtures of the said compounds. Mixtures of elementary tellurium and tellurium compounds may also be used. In regard to the catalytic activity of the catalyst, it is not decisive whether elementary tellurium is used or a tellurium compound.

The catalyst containing free and/or bound tellurium is suitably used on or together with inert carrier materials, for example aluminum oxide, aluminum silicate, silica gel, pumice, asbestos, feldspars, sandstone, clays, zeolites, carbon or silicon carbide. For the preparation of a system consisting of catalyst and carrier, a solution containing tellurium, for example a solution of tellurium-(IV)-chloride containing hydrochloric acid, is advantageously mixed with one of the above-mentioned carriers and the mixture is evaporated to dryness. The catalyst obtained in this manner, which contains the tellurium substantially in a bound form, can be used as such in the reaction. However, it may also be reduced, for example by means of hydrogen, sulfur dioxide or other agents having a reducing action, in which case the tellurium compounds are converted into elementary tellurium. Instead of solutions of tellurium-IV-chloride, solutions of other tellurium compounds may also be applied to the carrier, for example aqueous solutions of alkali metal tellurites, alkali metal tellurates or tellurium nitrates. After a certain starting period of the reaction, there is present, in most cases, a mixture of elementary and bound tellurium regardless of whether elementary tellurium or a tellurium compound has been used. The presence of selenium in the catalyst does not impede the reaction.

It is advantageous to adjust the content of tellurium or tellurium compounds of the catalyst/carrier system such that the system contains from 0.5 to 20% by weight of tellurium. However, the process can also be carried out without difficulties with lower or higher concentrations of tellurium.

The catalyst can, of course, also be used without the carrier material, for example in the form of tellurium metal powder or tellurium dioxide. It is, moreover, possible to use catalyst solutions, for example aqueous solutions of tellurium containing hydrochloric acid.

When using a solid catalyst, moreover, said catalyst can be surrounded by solvents which increase the concentration of one or more of the reaction partners in the reaction space. For example, a reactor which has been packed with the catalyst can be filled up with a liquid chlorinated hydrocarbon whereby high concentrations of dissolved ethylene are attained in the reactor.

The starting materials ethylene, oxygen and hydrogen chloride are advantageously used in the form of a gaseous mixture. In addition to the three reactants, the gaseous mixture may also contain gases which are inert towards the reaction, for example paraffins, nitrogen, noble gases, steam, chlorinated hydrocarbons such as methyl chloride or ethyl chloride, and carbon dioxide.

Particularly, the oxygen required may be supplied in the form of air and the required hydrogen chloride in the form of vapors of aqueous hydrochloric acid. If aqueous hydrochloric acid is used as a starting material, it can also be supplied to the catalyst in a liquid form.

The procedure is in detail carried out in such a manner that the reactants are passed through a tube packed with the catalyst, the gaseous mixture at the outlet of the reaction space is freed of the reaction products by partial condensation, if necessary, or by washing in stages, and the unreacted portions are recycled into the reaction zone.

The process is advantageously carried out at temperatures within the range of from 100° to 350° C., but it is also possible to operate outside these limits. It is in many cases advantageous to carry out the process under pressure, however, satisfactory conversions are also obtained under normal pressure. In consideration of the known explosive limits of the gaseous mixtures applied, the operation is generally carried out under pressures not exceeding 10 atmospheres gage. However, in many cases higher pressures may be applied, for example pressures of 20 atmospheres gage.

The explosive limits of the gaseous mixtures also influence the ratios to be chosen of the reactants. The process is, therefore, generally carried out with an excess of ethylene. However, stoichiometric mixtures may also be used or an excess amount of oxygen and/or hydrogen with respect to ethylene.

The reaction mixture is worked up according to known methods. The main products of the process are 1,2-dichlorethane and water. In addition thereto minor amounts of vinyl chloride, ethyl chloride, carbon dioxide as well as traces of higher chlorinated ethylenes and 1,1-dichlorethane are obtained. Rising reaction temperatures generally promote the formation of vinyl chloride. Ethyl chloride, which is probably formed by the addition of hydrogen chloride to ethylene in the reactor, can also be split again into hydrogen chloride and ethylene under the reaction conditions. It is advantageous therefore, to recycle ethyl chloride which may have been obtained into the reaction zone.

The advantage of using catalysts containing tellurium as compared with the copper catalysts known in industry is the much better selectivity in the formation of 1,2-dichlorethane. Under comparable conditions the yield is higher with the use of a catalyst containing tellurium.

The following examples serve to illustrate the invention, but they are not intended to limit it thereto:

EXAMPLE 1

150 cc. of aluminum oxide in the form of balls having a diameter of 6 mm. were evaporated to dryness with a solution of 8 grams telluium dioxide in 150 cc. of semi-concentrated hydrochloric acid. To reduce the tellumium-IV-compound to elementary tellurium, the product was treated with sulfur dioxide for 12 hours at 20/ C.

The finished catalyst was packed into a reaction tube having a diameter of 18 mm. Under normal pressure, a gaseous mixture consisting of 45 normal liters ethylene, 10 normal liters oxygen and 10 normal liters hydrogen chloride was passed over the catalyst per hour at 200° C. At the outlet of the reactor, the gaseous mixture was cooled, 4 grams of 1,2-dichlorethane in addition to about 1 gram of aqueous hydrochloric acid being obtained per hour. The off-gas leaving the condenser contained 0.05% by volume of vinyl chloride, 0.02% by volume of ethyl chloride, 0.05% by volume of carbon dioxide and again 0.05% by volume of 1,2-dichlorethane as well as traces of 1,1-dichlorethane. The conversion to 1,2-dichlorethane, therefore, amounted to about 20%.

At the end of the test, the catalyst contained, in addition to elementary tellurium, also a tellurium-IV- compound soluble in aqueous hydrochloric acid.

EXAMPLE 2

200 cc. (volume/lbs.) of aluminum silicate (bentonite) in the form of balls having a diameter of 5 mm. were added, respectively, to 17 grams of copper-II-chloride (=0.1 mole) in 200 ml. of 2-normal hydrochloric acid and to 16 grams tellurium dioxide (=0.1 mole) in 200 ml. of 5 normal hydrochloric acid. The two mixtures were evaporated to dryness in a rotary evaporator.

The finished catalysts were packed, respectively, into a reaction tube having an internal diameter of 25 mm. At 225° C. and under normal pressure, there were passed through each tube per hour 30 normal liters of a gaseous mixture consisting of 60% by volume of ethylene and 20% by volume, respectively, of hydrogen chloride and oxygen. At the outlets of the tubes the gaseous mixtures were cooled to +50° C., with the condensation of aqueous hydrochloric acid. The off gases were cooled to −60° C. After heating to room temperature, the condensation products obtained in this process were dried with calcium chloride and analysed.

The results of the analysis are embodied in the table. They show that the tellurium catalyst is superior to the known copper catalyst and, especially, that the amounts of higher chlorinated ethylenes and methanes obtained are substantially smaller.

TABLE.—COMPARISON OF THE YIELDS OBTAINED WHEN REACTING ETHYLENE, OXYGEN AND HYDROGEN CHLORIDE ACCORDING TO EXAMPLE 2

| Substance | Percent by weight in the dried condensation product with the use of a— | |
|---|---|---|
| | Tellurium catalyst | Copper catalyst |
| Vinyl chloride | 0.05 | 0.2 |
| Ethyl chloride | 0.2 | 0.6 |
| 1,1-dichlorethylene | 0.01 | 0.05 |
| 1,2-dichlorethylene (trans) | 0.05 | 0.2 |
| 1,2-dichlorethylene (cis) | 0.01 | 0.5 |
| 1,1-dichlorethane | 0.02 | 0.05 |
| 1,2-dichlorethane | 99.5 | 98.0 |
| Trichlorethylene | 0.05 | .01 |
| Methyl chloride | 0.01 | 001 |
| Methylene chloride | 0.01 | 0.1 |
| Chloroform | 0.01 | 0.1 |
| Carbon tetrachloride | 0.01 | 0.1 |
| Total | 99.93 | 99.92 |

We claim:
1. A process for preparing a chlorination product consisting essentially of 1,2-dichlorethane which comprises contacting ethylene, hydrogen chloride, and oxygen at a temperature of from 100° C. to 350° C. with a catalyst selected from the group consisting of tellurium, tellurium oxides, tellurium chlorides, tellurium oxychlorides, and mixtures thereof.

2. A process as in claim 1 wherein said catalyst is tellurium present on a carrier.

3. A process as in claim 1 wherein said catalyst is a mixture of tellurium and a member selected from the group consisting of tellurium oxides, tellurium chlorides and tellurium oxychlorides.

4. A process as in claim 3 wherein said catalyst is present on a carrier.

References Cited

FOREIGN PATENTS 1,365,892  5/1964  France.

LEON ZITVER, Primary Examiner
J. BOSKA, Assistant Examiner